Figure 1:
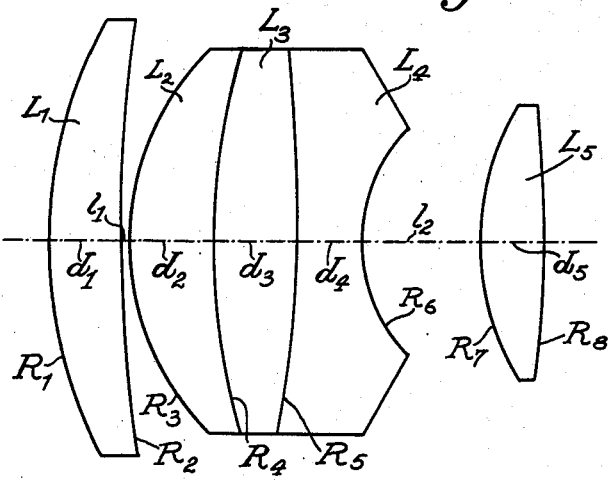

Dec. 27, 1938.   L. BERTELE   2,141,733

LENS SYSTEM

Filed Oct. 28, 1937

INVENTOR.
Ludwig Bertele
BY B. Singer
ATTORNEY.

Patented Dec. 27, 1938

2,141,733

UNITED STATES PATENT OFFICE 2,141,733

LENS SYSTEM

Ludwig Bertele, Dresden, Germany, assignor to Zeiss Ikon Aktiengesellschaft, Dresden, Germany Application October 28, 1937, Serial No. 171,459
In Germany July 20, 1937

4 Claims. (Cl. 88—57)

The invention relates to improvements in lens systems for photographic cameras and projectors.

It is an object of the invention to provide a lens system of extremely large relative aperture comprising three units separated from each other by air spaces. The first unit is a collective unit, the second unit is a meniscus unit with the convex side directed toward the object and the third unit is a collective unit consisting of one or two collective lenses each surrounded by air.

If an attempt is made to increase in a lens system composed of lenses of conventional shape the relative aperture for instance from 1:1.4 to 1:1.2 the result would be an undesirable large curvature of the spheric aberration characteristic.

It is now another object of the invention to overcome this disadvantage by increasing the thickness of the meniscus unit. Investigations have disclosed that when in a lens system of the type referred to the thickness of the meniscus unit is made more than 40% of the total focal length of the lens system that a very favorable course of the spheric aberration curve will be obtained and that the correction of the other picture errors may be accomplished in the same favorable manner.

The drawing illustrates by way of example two embodiments of a lens system of the invention having a relative aperture of 1:1.2, a focal length of 100 mm. and a picture angle of $\pm 10°$.

Figure 2:
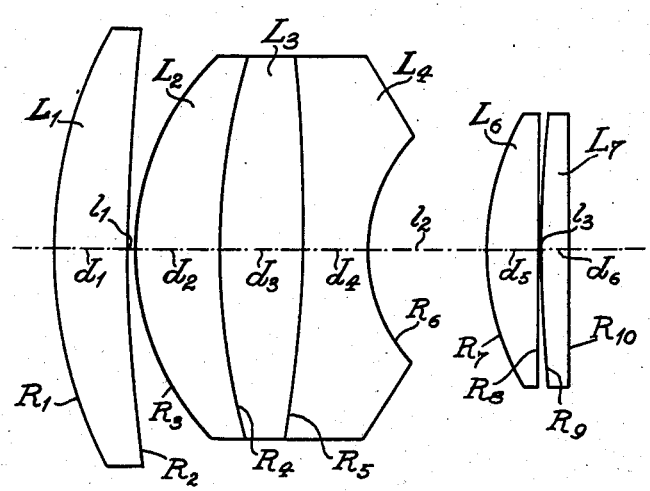

Fig. 1 shows diagrammatically the outline of the axial cross section of a lens system in which the lens unit facing the focal point consists of a single collective lens, and Fig. 2 shows diagrammatically the outline of the axial cross section of the second embodiment, in which the third lens unit—facing the focal point—consists of two collective lenses, each being surrounded by air.

In Fig. 1 the first or front unit of the lens system—so named because it faces the object to be photographed or the screen upon which the picture is to be projected, as the case may be— consists of a collective lens $L_1$, the second lens unit is spaced from the front unit by an air space $l_1$ and comprises two positive lenses $L_2$ and $L_3$ and a negative lens $L_4$, all three lenses being cemented together and forming a meniscus curved toward the front unit, the negative lens $L_4$ facing the second air space $l_2$. The third lens unit $L_5$ comprises a single collective lens $l_5$.

A practical embodiment of a lens system of this type may have the following optical data:

$R_1 = +92.28$
$\quad d_1 = 14.44 \quad n_d = 1.6664 \quad v = 48.6.$
$R_2 = +461.21$
$\quad l_1 = 0.56$
$R_3 = +53.61$
$\quad d_2 = 16.39 \quad n_d = 1.6203 \quad v = 60.2.$
$R_4 = +137.78$
$\quad d_3 = 16.11 \quad n_d = 1.4645 \quad v = 65.7.$
$R_5 = -271.11$
$\quad d_4 = 12.78 \quad n_d = 1.7552 \quad v = 27.5.$
$R_6 = +32.44$
$\quad l_2 = 23.61$
$R_7 = +5.17$
$\quad d_5 = 12.78 \quad n_d = 1.7015 \quad v = 41.2.$
$R_8 = -273.38$ Fig. 2 illustrates a modification in which the first two lens units $L_1$ and $L_2$, $L_3$, $L_4$ respectively are exactly the same as in the first embodiment and therefore are designated with the same reference characters. The third lens unit, however, is composed of two collective lenses $L_6$ and $L_7$ mounted separate from each other, or in other words, each being surrounded by air.

The optical data of this modified embodiment may be as follows:

$R_1 = +92.28$
$\quad d_1 = 14.44 \quad n_d = 1.6664 \quad v = 48.6.$
$R_2 = +461.21$
$\quad l_1 = 0.56$
$R_3 = +53.61$
$\quad d_2 = 16.39 \quad n_d = 1.6203 \quad v = 60.2.$
$R_4 = +137.78$
$\quad d_3 = 16.11 \quad n_d = 1.4645 \quad v = 65.7.$
$R_5 = -271.11$
$\quad d_4 = 12.78 \quad n_d = 1.7552 \quad v = 27.5.$
$R_6 = +32.44$
$\quad l_2 = 23.61$
$R_7 = +52.17$
$\quad d_5 = 10.00 \quad n_d = 1.7015 \quad v = 41.2.$
$R_8 = \infty$
$\quad l_3 = 0.00$
$R_9 = +286.33$
$\quad d_6 = 5.56 \quad n_d = 1.7015 \quad v = 41.2.$
$R_{10} = \infty$

What I claim is:

1. A lens system of large relative aperture, comprising three lens units separated from each other by air spaces, the front unit being a collective lens, the center unit being made up of a convexo-concave lens, a convex lens and a concave lens all cemented together in the order named and forming a meniscus curved toward said front unit, said convex lens having a lower refractive index than said concave lens which faces the second air space, the concave outer face of said meniscus having a radius of curvature less than 0.5 and greater than 0.28 the focal length of the lens system and being smaller than the convex outer face of the said meniscus, the third lens unit being collective and having a convex face which faces said second air space and having a smaller radius of curvature than the outer face of said third lens unit, the thickness of said center lens unit measured along the optical axis being greater than 0.4 and less than 0.6 the total focal length of the lens system.

2. A lens system of large relative aperture, comprising three lens units separated from each other by air spaces, the front unit being a collective lens, the center unit being made up of a convexo-concave lens, a convex lens and a concave lens all cemented together in the order named and forming a meniscus curved toward said front unit, said convex lens having a lower refractive index than said concave lens which faces the second air space, the concave outer face of said meniscus having a radius of curvature less than 0.5 and greater than 0.28 the focal length of the lens system and being smaller than the convex outer face of the said meniscus, the third lens unit being a collective lens having two convex faces of which the one which faces the center lens unit has a smaller radius of curvature than the other, the thickness of said center lens unit measured along said optical axis being greater than 0.4 and less than 0.6 the total focal length of the lens system.

3. A lens system of large relative aperture, comprising three lens units separated from each other by air spaces, the front unit being a collective lens, the center unit being made up of a convexo-concave lens, a convex lens and a concave lens all cemented together in the order named and forming a meniscus curved toward said front unit, said convex lens having a lower refractive index than said concave lens which faces the second air space, the concave outer face of said meniscus having a radius of curvature less than 0.5 and greater than 0.28 the focal length of the lens system and being smaller than the convex outer face of the said meniscus, the third lens unit being composed of two separate collective lenses, one of said two separate lenses having a convex face which faces said second air space, said convex face having a smaller radius of curvature than the three other faces of said two lenses said center lens unit measured along the optical axis having a thickness greater than 0.4 and less than 0.6 the total focal length of the lens system.

4. A lens system of large relative aperture, comprising three lens units separated from each other by air spaces, the front unit being a collective lens, the center unit being made up of a convexo-concave lens, a convex lens and a concave lens all cemented together in the order named and forming a meniscus curved toward said front unit, said convex lens having a lower refractive index than said concave lens which faces the second air space, the concave outer face of said meniscus having a radius of curvature less than 0.5 and greater than 0.28 the focal length of the lens system and being smaller than the convex outer face of the said meniscus, the third lens unit being composed of two separate convexo-plane lenses having their convex faces directed toward the front of the lens system, the convex face of one of said convexo-plane lenses having a smaller radius of curvature than the outer and facing said second air space, said center lens unit measured along the optical axis having a thickness greater than 0.4 and less than 0.6 the total focal length of the lens system.

LUDWIG BERTELE.